(12) United States Patent
Ikeda

(10) Patent No.: US 7,169,851 B2
(45) Date of Patent: Jan. 30, 2007

(54) THERMOPLASTIC ELASTOMER MOLDING

(75) Inventor: Shinya Ikeda, Tokyo (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 10/522,745

(22) PCT Filed: Jul. 25, 2003

(86) PCT No.: PCT/JP03/09445

§ 371 (c)(1),
(2), (4) Date: Jan. 28, 2005

(87) PCT Pub. No.: WO2004/011551

PCT Pub. Date: Feb. 5, 2004

(65) Prior Publication Data

US 2005/0245682 A1    Nov. 3, 2005

(30) Foreign Application Priority Data

Jul. 31, 2002 (JP) ............................. 2002-224158
Dec. 12, 2002 (JP) ............................. 2002-360859

(51) Int. Cl.
*C08L 53/00* (2006.01)
(52) U.S. Cl. ........................................ 525/89; 525/99
(58) Field of Classification Search ................. 525/89, 525/99
See application file for complete search history.

(56) References Cited

U.S. PATENT DOCUMENTS

| | | | | |
|---|---|---|---|---|
| 3,750,499 A | * | 8/1973 | Peasley | 82/164 |
| 4,054,330 A | * | 10/1977 | Luo | 384/53 |
| 4,199,490 A | * | 4/1980 | Kamiya et al. | 524/501 |
| 5,089,550 A | * | 2/1992 | Sakagami et al. | 525/314 |
| 5,270,388 A | | 12/1993 | Onishi et al. | |
| 5,274,036 A | * | 12/1993 | Korpman et al. | 525/92 K |
| 5,648,136 A | * | 7/1997 | Bird | 428/76 |
| 5,678,678 A | * | 10/1997 | Brandt et al. | 194/206 |
| 5,851,664 A | * | 12/1998 | Bennett et al. | 428/355 BL |
| 5,977,235 A | * | 11/1999 | Fujii et al. | 524/431 |
| 6,471,625 B1 | * | 10/2002 | Jimenez | 492/6 |
| 2001/0018490 A1 | | 8/2001 | Mashita et al. | |

FOREIGN PATENT DOCUMENTS

JP     53-43539 A     11/1978
JP     11-199714 A     7/1999

* cited by examiner

*Primary Examiner*—Jeffrey Mullis
(74) *Attorney, Agent, or Firm*—Birch, Stewart, Kolasch & Birch, LLP

(57) ABSTRACT

The invention provides a molding formed of a thermoplastic elastomer composition which molding exhibits suppressed compression set and satisfactory tensile strength while exhibiting low hardness.

The molding is formed of a thermoplastic elastomer resin composition comprising; an aromatic vinyl-isoprene block copolymer (a) including two or more poly(aromatic vinyl) blocks each having a weight-average molecular weight of 14,000 to 100,000, in an amount of 55 to 95 wt %; an aromatic vinyl-isoprene diblock copolymer (b) in an amount of 0 to 40 wt %; and polyisoprene (c) having a weight-average molecular weight of 5,000 to 300,000, in an amount of 5 to 33 wt %; wherein the composition has an aromatic vinyl monomer unit content of 14 to 30 wt % based on the total amount of the components (a), (b), and (c).

The molding can be widely employed in a variety of uses where the characteristics of the product are advantageous; such as roller members (e.g., a transport roller and a feed roller) used in OA machines and office machines.

10 Claims, No Drawings

THERMOPLASTIC ELASTOMER MOLDING

TECHNICAL FIELD

The present invention relates to a thermoplastic elastomer molding(s) which exhibits suppressed compression set and satisfactory tensile strength while exhibiting low hardness.

BACKGROUND ART

Generally, as compared with cross-linked rubber, thermoplastic elastomers are advantageous in terms of production, since the production requires no cross-linking step. Moreover, the thus-produced thermoplastic elastomers are easy to recycle. In addition, in use, thermoplastic elastomers are generally harmless polymers, by virtue of having no cross-linking agent added thereto.

Examples of such thermoplastic elastomers include styrene-based thermoplastic elastomer, olefin-based thermoplastic elastomer, vinyl chloride-based thermoplastic elastomer, polyurethane-based thermoplastic elastomer, and polyamide-based thermoplastic elastomer. As compared with vulcanized rubber, these thermoplastic elastomers generally have high hardness and high compression set.

Compression set of thermoplastic elastomer can be reduced through cross-linking reaction by the mediation of a cross-linking agent added thereto. However, in this case, hardness increases further.

In contrast, low-hardness moldings can be produced from thermoplastic elastomer into which a plasticizer has been incorporated in a large amount. However, such moldings generally have problems, including reduction in tensile strength and bleeding of the plasticizer from the obtained moldings.

Thus, conventionally, many studies have been carried out in order to solve the aforementioned problems and to produce a thermoplastic elastomer having reduced hardness and suppressed compression set.

For example, there has been disclosed a thermoplastic elastomer composition containing a styrene block copolymer, a low-molecular weight polyolefin-based softening agent, a plasticizer, and a polyolefin-based processing aid (see Japanese Patent Application Laid-Open (kokai) No. 61-243852). However, the disclosed thermoplastic elastomer composition has a hardness A by JIS as high as 50 to 75.

Another thermoplastic elastomer composition containing a hydrogenated product of a block copolymer including at least two polystyrene blocks; a hydrogenated product of a low-molecular weight conjugated diene polymer; and a polyolefin resin has been disclosed (see Japanese Patent Application Laid-Open (kokai) No. 8-41283). However, the disclosed composition has a JIS hardness A higher than 70, although the composition exhibits suppressed compression set and excellent tensile strength.

There has been disclosed yet another thermoplastic elastomer composition (see Japanese Patent Application Laid-Open (kokai) No. 2000-44691), which is produced by sequentially kneading a hydrogenated product of a block copolymer including a poly(aromatic vinyl) block and a poly(conjugated diene) block; a non-aromatic oil; and a polyolefin resin by means of a twin-screw extruder. However, the disclosed composition has a poor tensile strength as low as about 4 MPa, although the composition has a low JIS hardness A of 22 and exhibits suppressed compression set.

As described above, when a thermoplastic elastomer having low hardness and suppressed compression set is produced, the hardness can be lowered to only a limited degree. When the hardness is sufficiently lowered through addition of a predetermined amount of oil for preventing bleeding, tensile strength is poor.

DISCLOSURE OF THE INVENTION

In view of the foregoing, an object of the present invention is to provide a molding formed of a thermoplastic elastomer composition, which molding exhibits suppressed compression set and satisfactory tensile strength while exhibiting low hardness.

The present inventors have carried out extensive studies, and have found that the aforementioned object can be attained through employment of a thermoplastic elastomer composition containing, in a specific proportion by amount, an aromatic vinyl-isoprene block copolymer including two or more poly(aromatic vinyl) blocks having a specific weight-average molecular weight, and a polyisoprene having a specific weight-average molecular weight. The present invention has been accomplished on the basis of this finding.

Accordingly, the present invention provides a molding formed of a thermoplastic elastomer composition comprising: an aromatic vinyl-isoprene block copolymer (a) including two or more poly(aromatic vinyl) blocks each having a weight-average molecular weight of 14,000 to 100,000, in an amount of 55 to 95 wt %; an aromatic vinyl-isoprene diblock copolymer (b) in an amount of 0 to 40 wt %; and polyisoprene (c) having a weight-average molecular weight of 5,000 to 300,000, in an amount of 5 to 33 wt %; wherein the composition has an aromatic vinyl monomer unit content of 14 to 30 wt % based on the total amount of the components (a), (b), and (c).

The invention provides a molding formed of a thermoplastic elastomer resin composition, which molding exhibits suppressed compression set and satisfactory tensile strength while exhibiting low hardness. The molding finds utility in a variety of fields which can make good use of the characteristics of the product, such as roller members (e.g., a transport roller and a feed roller) used in OA machines and office machines.

BEST MODES FOR CARRYING OUT THE INVENTION

The molding of the present invention is formed of a thermoplastic elastomer composition comprising: an aromatic vinyl-isoprene block copolymer (a) including two or more poly(aromatic vinyl) blocks each having a weight-average molecular weight of 14,000 to 100,000, in an amount of 55 to 95 wt %; an aromatic vinyl-isoprene diblock copolymer (b) in an amount of 0 to 40 wt %; and polyisoprene (c) having a weight-average molecular weight of 5,000 to 300,000, in an amount of 5 to 33 wt %; wherein the composition has an aromatic vinyl monomer unit content of 14 to 30 wt % based on the total amount of the components (a), (b), and (c).

The aromatic vinyl-isoprene block copolymer (a) (hereinafter referred to as component (a)) employed in the present invention includes two or more poly(aromatic vinyl) blocks; i.e., at least three polymer blocks.

The poly(aromatic vinyl) block contained in component (a) is a portion of a polymer chain of component (a) containing an aromatic vinyl monomer unit as a predomi nant structural unit. The poly(aromatic vinyl) block preferably has an aromatic vinyl monomer unit content of 80 wt % or more. A poly(aromatic vinyl) block formed through homopolymerization of an aromatic vinyl monomer is particularly preferred.

Examples of the aromatic vinyl monomer include styrene, α-methylstyrene, o-methylstyrene, m-methylstyrene, p-methylstyrene, 2,4-dimethylstyrene, ethylstylene, and p-tert-butylstyrene. Of these, styrene is preferably employed.

So long as the substantial effects of the present invention are not affected adversely, the poly(aromatic vinyl) block contained in component (a) may be a copolymer of an aromatic vinyl monomer and a monomer which can be polymerized with the aromatic vinyl monomer. Examples of preferred monomers which can be polymerized with an aromatic vinyl monomer include conjugated diene monomers such as 1,3-butadiene, isoprene, 2,3-dimethyl-1,3-butadiene, and 1,3-pentadiene.

The poly(aromatic vinyl) block contained in component (a) has a weight-average molecular weight of 14,000 to 100,000, preferably 16,000 to 80,000, particularly preferably 22,000 to 50,000. When the molecular weight of the poly(aromatic vinyl) block is excessively small, compression set of the thermoplastic elastomer composition is large, whereas when the molecular weight is excessively large, flowability of the thermoplastic elastomer composition is impaired, resulting in poor injection-moldability.

The poly(aromatic vinyl) block contained in component (a) preferably has a ratio (Mw/Mn) of weight-average molecular weight (Mw) to number-average molecular weight (Mn) of 2 or less, more preferably 1.5 or less.

The polyisoprene block contained in component (a) is a portion of a polymer chain of component (a) containing an isoprene unit as a predominant structural unit. The polyisoprene block preferably has an isoprene unit content of 80 wt % or more. A polyisoprene block formed through homopolymerization of isoprene is particularly preferred.

So long as the substantial effects of the present invention are not affected adversely, the polyisoprene block contained in component (a) may be a copolymer of isoprene and a monomer which can be polymerized with isoprene. Examples of preferred monomers which can be polymerized with isoprene include the aforementioned aromatic vinyl monomers; and conjugated diene monomers (other than isoprene) such as 1,3-butadiene, 2,3-dimethyl-1,3-butadiene, and 1,3-pentadiene.

The aromatic vinyl monomer unit content of component (a) is generally 15 to 75 wt %, preferably 17 to 50 wt %, more preferably 20 to 40 wt %.

No particular limitation is imposed on the vinyl bond content of the isoprene unit contained in component (a), and the vinyl bond content is generally 50 wt % or less, preferably 20 wt % or less, more preferably 5 to 10 wt %.

The component (a) preferably has a weight-average molecular weight of 120,000 to 1,200,000, more preferably 140,000 to 1,000,000, particularly preferably 160,000 to 800,000.

The component (a) preferably has a ratio (Mw/Mn) of weight-average molecular weight (Mw) to number-average molecular weight (Mn) of 2 or less, more preferably 1.5 or less.

The thermoplastic elastomer composition has a component (a) content of 55 to 95 wt %, preferably 55 to 89 wt %, more preferably 55 to 85 wt %. When the content is excessively small, tensile strength of the moldings is considerably lowered and compression set increases, whereas when the content is excessively large, hardness increases.

The aromatic vinyl-isoprene diblock copolymer (b) (hereinafter referred to as component (b)) is a block copolymer consisting of one single poly(aromatic vinyl) block and one single polyisoprene block.

The poly(aromatic vinyl) block contained in component (b) is a portion of a polymer chain of component (b) containing an aromatic vinyl monomer unit as a predominant structural unit. The poly(aromatic vinyl) block preferably has an aromatic vinyl monomer unit content of 80 wt % or more. A poly(aromatic vinyl) block formed exclusively from an aromatic vinyl monomer unit is more preferred.

The same aromatic vinyl monomers as described above may also be employed. Of these, styrene is preferably employed.

So long as the substantial effects of the present invention are not affected adversely, the poly(aromatic vinyl) block contained in component (b) may be a copolymer of an aromatic vinyl monomer and a monomer which can be polymerized with the aromatic vinyl monomer. Examples of preferred monomers which can be polymerized with an aromatic vinyl monomer include conjugated diene monomers such as 1,3-butadiene, isoprene, 2,3-dimethyl-1,3-butadiene, and 1,3-pentadiene.

Similar to the poly(aromatic vinyl) block contained in component (a), the poly(aromatic vinyl) block contained in component (b) preferably has a weight-average molecular weight of 14,000 to 100,000, more preferably 16,000 to 80,000, particularly preferably 22,000 to 50,000.

The poly(aromatic vinyl) block contained in component (b) preferably has a ratio (Mw/Mn) of weight-average molecular weight (Mw) to number-average molecular weight (Mn) of 2 or less, more preferably 1.5 or less.

The polyisoprene block contained in component (b) is a portion of a polymer chain of component (b) containing an isoprene unit as a predominant structural unit. The polyisoprene block preferably has an isoprene unit content of 80 wt % or more. A polyisoprene block formed exclusively from an isoprene unit is particularly preferred. When the isoprene unit content is excessively small, the moldings tend to have high hardness.

So long as the substantial effects of the present invention are not affected adversely, the polyisoprene block contained in component (b) may be a copolymer of isoprene and a monomer which can be polymerized with isoprene. Examples of preferred monomers which can be polymerized with isoprene include the aforementioned aromatic vinyl monomers; and conjugated diene monomers (other than isoprene) such as 1,3-butadiene, 2,3-dimethyl-1,3-butadiene, and 1,3-pentadiene.

The aromatic vinyl monomer unit content of component (b) is generally 15 to 75 wt %, preferably 17 to 50 wt %, more preferably 20 to 40 wt %.

No particular limitation is imposed on the vinyl bond content of the isoprene unit contained in component (b), and the vinyl bond content is generally 50 wt % or less, preferably 20 wt % or less, more preferably 5 to 10 wt %.

The component (b) preferably has a weight-average molecular weight of 60,000 to 250,000, more preferably 70,000 to 230,000, particularly preferably 80,000 to 220,000.

The component (b) preferably has a ratio (Mw/Mn) of weight-average molecular weight (Mw) to number-average molecular weight (Mn) of 2 or less, more preferably 1.5 or less.

The thermoplastic elastomer composition has a component (b) content of 0 to 40 wt %, preferably 1 to 35 wt %, more preferably 5 to 30 wt %. When the component (b)

content is excessively large, tensile strength of the moldings is considerably lowered and compression set increases.

No particular limitation is imposed on the method for producing component (a), and any known method may be employed. For example, there may be employed anionic living polymerization including successive polymerization of a poly(aromatic vinyl) block and polyisoprene block, or a method including producing a block copolymer having active terminals which participate in living polymerization (hereinafter referred to as living active terminals) and reacting the block copolymer with a coupling agent, thereby producing a coupled block copolymer.

No particular limitation is imposed on the method for producing component (b), and any known method may be employed. For example, anionic living polymerization including successive polymerization of a poly(aromatic vinyl) block and polyisoprene block may be employed.

As described above, the components (a) and (b) may be produced separately. Alternatively, as described below, the respective polymerization steps may be carried out in combination, thereby producing a mixture of the components (a) and (b).

The mixture of the components (a) and (b) may be produced through the following steps. In a first step, an aromatic vinyl monomer is polymerized through anionic living polymerization in a polymerization solvent in the presence of an anionic polymerization initiator, thereby forming a poly(aromatic vinyl) block having living active terminals. In a second step, isoprene is polymerized from the living active terminals of the poly(aromatic vinyl) block, thereby producing an aromatic vinyl-isoprene diblock copolymer having living active terminals. In a third step, a portion of the aromatic vinyl-isoprene diblock copolymer having living active terminals is reacted with a coupling agent, thereby producing a coupled aromatic vinyl-isoprene-aromatic vinyl block copolymer (corresponding to component (a)). In a fourth step, the remaining portion of the aromatic vinyl-isoprene diblock copolymer having living active terminals is treated with a polymerization terminator, thereby deactivating the living active terminals to form an aromatic vinyl-isoprene diblock copolymer (corresponding to component (b)). The specific procedure of the steps will next be described from the first step to the fourth step.

In the first step, an aromatic vinyl monomer is polymerized in a polymerization solvent in the presence of an anionic polymerization initiator, thereby forming a poly(aromatic vinyl) block having living active terminals.

No particular limitation is imposed on the polymerization solvent, so long as the solvent is inert to the polymerization initiator. For example, linear hydrocarbon solvent, cyclic hydrocarbon solvent, or a mixture thereof may be employed. Examples of the linear hydrocarbon solvent include n-butane, isobutane, n-hexane, 1-butene, isobutylene, trans-2-butene, cis-2-butene, 1-pentene, trans-2-pentene, cis-2-pentene, n-pentane, trans-2-pentane, neopentane, and mixtures thereof. Examples of the cyclic hydrocarbon solvent include benzene, toluene, xylene, and cyclohexane. From the viewpoint of easy control of polymerization temperature and molecular weight of the produced polymer, in use, linear hydrocarbon solvent and cyclic hydrocarbon solvent are preferably mixed at a ratio (by weight) of 5:95 to 50:50, more preferably 10:90 to 40:60.

The polymerization solvent is generally used in an amount of 100 to 1,000 parts by weight based on 100 parts by weight of monomer(s) to be polymerized, preferably 150 to 400 parts by weight.

No particular limitation is imposed on the type of the anionic polymerization initiator, and any known initiator useful for proceeding polymerization of an aromatic vinyl monomer and isoprene may be employed. Specific examples include organic monolithium initiators such as methyllithium, n-propyllithium, n-butyllithium, and sec-butyllithium. Of these, n-butyllithium is preferred. The amount of the polymerization initiator may be appropriately predetermined in a routine manner such that a polymer having a weight-average molecular weight of interest can be produced.

The polymerization is preferably performed in the presence of a polar compound from the viewpoint of easy control of polymerization rate and producing a polymer exhibiting a sharp molecular weight distribution profile. Such polar compounds which are preferably employed in the present invention includes an aromatic ether, an aliphatic ether, and a tertiary amine, each having a specific dielectric constant of 2.5 to 5.0 as measured at 25° C. Specific examples of the polar compound include aromatic ethers such as diphenyl ether and anisole; aliphatic ethers such as diethyl ether and dibutyl ether; tertiary monoamines such as trimethylamine, triethylamine, and tripropylamine; tertiary polyamines such as tetramethylethylenediamine and tetraethylethylenediamine. Of these, tetramethylethylenediamine is preferably employed.

The polar compound is preferably used in an amount of 0.05 to 0.5 mol based on 1 mol of anionic polymerization initiator, more preferably 0.01 to 0.1 mol.

In the second step, isoprene is polymerized from the living active terminals of the poly(aromatic vinyl) block, thereby producing an aromatic vinyl-isoprene diblock copolymer having living active terminals. In order to prevent sudden generation of heat of reaction, reaction is preferably allowed to proceed under continuous addition of isoprene.

In the third step, a portion of the aromatic vinyl-isoprene diblock copolymer having living active terminals is reacted with a coupling agent, thereby producing a coupled aromatic vinyl-isoprene-aromatic vinyl block copolymer (corresponding to component (a)).

The coupling agent has two or more polymer-linking sites for reacting with the living active terminals of the polymer molecule.

Examples of the bi-functional coupling agent having two reactive sites include bi-functional halosilanes such as dichlorosilane, monomethyldichlorosilane, and dimethyldichlorosilane; bi-functional alkoxysilanes such as diphenyldimethoxysilane and diphenyldiethoxysilane; bi-functional haloalkanes such as dichloroethane, dibromoethane, methylene chloride, and dibromomethane; bi-functional tin halides such as dichlorotin, monomethyldichlorotin, dimethyldichlorotin, monoethyldichlorotin, diethyldichlorotin, monobutyldichlorotin, and dibutyldichlorotin; benzoic acid, CO, and 2-chloropropene.

Examples of the coupling agent having three or more functionalities (i.e., having three or more reactive sites) include tri-functional haloalkanes such as trichloroethane and trichloropropane; tetra-functional halosilanes such as tetrachlorosilane and tetrabromosilane; tetra-functional alkoxysilanes such as tetramethoxysilane, tetraethoxysilane, and phenyltrimethoxysilane; and tetra-functional tin compounds such as tetrachlorotin and tetrabromotin.

Of these, bi-functional coupling agents are preferred, with dimethyldichlorosilane being more preferred.

The amount of the coupling agent may be appropriately predetermined such that the coupled aromatic vinyl-isoprene-aromatic vinyl block copolymer (corresponding to component (a)) is produced in an amount of interest.

In the fourth step, the remaining portion of the aromatic vinyl-isoprene diblock copolymer having living active terminals is treated with a polymerization terminator, thereby deactivating the living active terminals to form an aromatic vinyl-isoprene diblock copolymer (corresponding to component (b)).

Polymerization inhibitors which are conventionally employed in anionic living polymerization may be used in the present invention. Examples include water; alcohols such as methyl alcohol and ethyl alcohol; and inorganic acids and organic acids such as hydrochloric acid and acetic acid.

Through the aforementioned steps, a solution containing components (a) and (b) can be produced. If necessary, an anti-aging agent is added to the solution, and the formed polymer is separated from the solution through a known polymer separation technique such as steam stripping, followed by drying, thereby yielding a mixture of components (a) and (b).

When the aforementioned mixture of components (a) and (b) is produced, the ratio of the amount of component (a) to the total amount of components (a) and (b) is controlled to 50 wt % or more, preferably 60 wt % or more, particularly preferably 70 wt % or more. When the ratio is excessively small, in some cases, additional component (a), which has been separately produced, must be added for producing a thermoplastic elastomer composition of the present invention. The ratio can be modified by adjusting the amount of the coupling agent employed.

The polyisoprene (c) employed in the present invention (hereinafter also referred to as component (c)) has a weight-average molecular weight of 5,000 to 300,000, preferably 10,000 to 250,000, particularly preferably 30,000 to 200,000. When the weight-average molecular weight is excessively small, tensile strength is considerably lowered, and the surfaces of moldings become sticky, whereas when the weight-average molecular weight is excessively large, hardness increases, and compression set is large.

The component (c) preferably has a ratio (Mw/Mn) of weight-average molecular weight (Mw) to number-average molecular weight (Mn) of 2 or less, more preferably 1.5 or less.

The component (c) contains an isoprene unit as a predominant structural unit in the polymer chains thereof. The component (c) preferably has an isoprene unit content of 80 wt % or more. Particularly preferably, the component (c) is exclusively formed from an isoprene unit.

The component (c) is preferably an isoprene homopolymer. However, so long as the substantial effects of the present invention are not affected adversely, the component (c) may be a copolymer of isoprene and a monomer which can be polymerized with isoprene. Examples of preferred monomers which can be polymerized with isoprene include the aforementioned aromatic vinyl monomers; and conjugated diene monomers (other than isoprene) such as butadiene and 1,3-pentadiene.

No particular limitation is imposed on the vinyl bond content of each isoprene unit contained in component (c), and the content is generally 50 wt % or less, preferably 20 wt % or less, more preferably 5 to 10 wt %.

No particular limitation is imposed on the method for producing component (c), and any known method may be employed. For example, isoprene may be polymerized in a polymerization solvent in the presence of the aforementioned anionic polymerization initiator.

The thermoplastic elastomer composition contains component (c) in an amount of 5 to 33 wt %, preferably 10 to 30 wt %, more preferably 15 to 30 wt %. When the amount of component (c) is excessively small, hardness increases, whereas when the amount is excessively large, tensile strength decreases, and the surfaces of moldings tend to be sticky.

The thermoplastic elastomer composition employed in the present invention essentially has an aromatic vinyl monomer unit content of 14 to 30 wt % based on the total amount of components (a), (b), and (c). Preferably, the content falls within a range of 14 to 28 wt %, more preferably 16 to 25 wt %. When the content is excessively small, compression set increases, whereas when the content is excessively large, hardness increases.

Among physical properties, the thermoplastic elastomer composition employed in the present invention preferably exhibits a compression set, as measured in accordance with JIS K 6301 at 70° C. (22 hours after), of 60% or less, more preferably 40% or less; a hardness A by JIS of 40 or less, more preferably 10 to 30; and a tensile strength (JIS K 6301) of 6 MPa or more, more preferably 8 MPa or more. The composition exhibiting physical properties falling within the aforementioned ranges can provide moldings exhibiting suppressed compression set and satisfactory tensile strength while exhibiting low hardness.

In order to impart such desirable physical properties to the elastomer composition, among others, the weight-average molecular weight of a poly(aromatic vinyl) block contained in component (a) and the component (c) content are preferably controlled so as to fall within preferred ranges, so long as the preferred ranges satisfy the aforementioned compositional requirements.

No particular limitation is imposed on the method for producing the thermoplastic elastomer composition employed in the present invention. Individually produced components (a), (b), and (c) may be kneaded to produce the composition. Alternatively, the composition may be produced by mixing solutions of each component, separating the formed polymer from the mixture, and drying.

Alternatively, the thermoplastic elastomer composition may be produced by blending separately produced component (c) with a produced mixture of components (a) and (b).

In addition to an elastomer other than components (a), (b), and (c), conventionally known additives may be added in desired amounts to the thermoplastic elastomer composition of the present invention in accordance with needs. Examples of the additives include thermoplastic resins, fillers, reinforcing fibers, softening agents, foaming agents, foaming aids, antioxidants, flame retardants, antimicrobials, light stabilizers, UV absorbents, dyes, pigments, lubricants, internal mold release agents, anti-blocking agents, slipping agents, antistatic agents, cross-linking agents, cross-linking aids, vulcanizing agents, and vulcanizing accelerators.

Examples of the elastomers other than components (a), (b), and (c) include styrene-butadiene-styrene block copolymer, styrene-ethylene-butylene-styrene block copolymer, styrene-ethylene-propylene-styrene block copolymer, styrene-butadiene random copolymer, acrylonitrile-butadiene copolymer, ethylene-propylene copolymer, ethylene-propylene-non-conjugated diene copolymer, ethylene-butene copolymer, ethylene-octene copolymer, ethylene-vinyl acetate copolymer, ethylene-acrylic acid ester copolymer, chlorinated polyethylene, polybutadiene rubber, polyisobutylene rubber, polyisoprene rubber, natural rubber, acrylic rubber, chloroprene rubber, silicone rubber, fluororubber, urethane rubber, polyurethane thermoplastic elastomer, polyamide thermoplastic elastomer, polyester thermoplastic elastomer, and polyolefin thermoplastic elastomer.

Examples of the thermoplastic resins include polyethylene and modified products thereof, polypropylene, polyvinyl chloride, polystyrene, acrylonitrile-styrene copolymer, acrylonitrile-butadiene-styrene copolymer, and polyphenylene ether.

Examples of the fillers include carbon black, clay, diatomaceous earth, silica, talc, barium sulfate, calcium carbonate, magnesium carbonate, metal oxides, mica, graphite, aluminum hydroxide, metal powders, wood powders, glass powders, and ceramic powders; inorganic hollow fillers such as glass balloons and silica balloons; and organic hollow fillers such as polystyrene, polyvinylidene fluoride, and polyvinylidene fluoride copolymer.

Examples of the reinforcing fibers include short fibers and long fibers such as straws, fur and wool, glass fiber, metallic fiber, and various polymer fibers.

Examples of the softening agents include extender oils such as aromatic process oil, paraffin process oil, and naphthene process oil; and liquid polymers such as polybutene and polyisobutylene.

Examples of the foaming agents include inorganic forming agents such as sodium bicarbonate, sodium carbonate, ammonium bicarbonate, ammonium carbonate, and ammonium nitrite; nitroso compounds such as N,N'-dimethyl-N, N'-dinitrosoterephthalamide, and N,N'-dinitrosopentamethylenetetramine; azo compounds such as azodicarbonamide, azobisisobutyronitrile, azobiscyclohexylnitrile, azodiaminobenzene, and barium azodicarboxylate; sulfonylhydrazide compounds such as benzenesulfonylhydrazide, toluenesulfonylhydrazide, p,p'-oxybis(benzenesulphonylhydrazide), and diphenylsulfone-3,3'-disulfonylhydrazide; and azide compounds such as calcium azide, 4,4'-diphenyldisulfonylazide, and p-toluenesulfonylazide.

A foaming aid lowers decomposition temperature of a foaming agent, promotes decomposition of the foaming agent, and provides uniformly foamed products. Examples of the foaming aid include organic acids such as salicylic acid, phthalic acid, stearic acid, and oxalic acid; and urea and derivatives thereof.

Examples of the antioxidants include hindered phenol compounds such as 2,6-di-tert-butyl-p-cresol and pentaerythrityl tetrakis[3-(3,5-di-tert-butyl-4-hydroxyphenyl) propionate]; thiodicarboxylate esters such as dilauryl thiodipropionate and distearyl thiodipropionate; phosphites such as tris(nonylphenyl) phosphite and 4,4'-butylidene-bis(3-methyl-6-tert-butylphenyl)ditridecyl phosphite.

The molding of the present invention is formed of the aforementioned thermoplastic elastomer composition, and is produced by molding the thermoplastic elastomer composition through a molding method such as injection molding (insert molding, two color molding, sandwich molding, gas injection molding, and the like), extrusion molding, inflation molding, T-die film molding, laminate molding, blow molding, hollow molding, compression molding, calender molding, rotating molding, transfer molding, vacuum molding, or powder slush molding.

The molding method is appropriately selected in accordance with the shape of moldings and other factors. In particular, the aforementioned thermoplastic elastomer composition is preferably molded through injection molding.

The molding of the present invention is formed of the aforementioned thermoplastic elastomer composition exhibiting suppressed compression set and satisfactory tensile strength while exhibiting low hardness. Thus, the molding can be suitably employed as roller members used in OA machines, office machines, and other machines and equipment.

The roller of the present invention includes, as an elastic member, a molding formed of the aforementioned thermoplastic elastomer composition. Generally, such a roller is composed of a shaft and the aforementioned elastic member.

Examples of the material forming the shaft include metals such as iron and stainless steel; thermoplastic resins such as 6-nylon, 6,6-nylon, polyacetal, polycarbonate, and polyphenylene ether; and thermosetting resins such as epoxy resin, phenolic resin, and urethane resin.

No particular limitation is imposed on the shape of the shaft, and the shape may be appropriately selected so as to form a desired roller. The surface of the shaft may be smooth or worked to form wavy or toothed grooves.

The surface of the shaft may be roughened in advance by means of shot blast, sand blast, sand paper, etc. Alternatively, a coating agent may be applied to the surface in order to enhance adhesion to an elastic member.

No particular limitation is imposed on the shape of the roller. Generally, the roller is a hollow cylinder or a columnar.

The surface of the roller may be smooth, or may be grooved (i.e., toothed, knurled, or embossed).

The grooves provided on the surface of the roller may be formed by means of a metal mold having an inner surface on which a specific groove pattern has been provided. Alternatively, the grooves may be formed through polishing the surface of a molded roller by means of shot blast, sand blast, sand paper, etc.

The roller of the present invention may have a single layer structure consisting of a single elastic member layer formed of the aforementioned thermoplastic elastomer composition, or a multi-layer structure including a layer formed of a component other than the aforementioned thermoplastic elastomer composition.

No particular limitation is imposed on the thickness of the elastic member layer formed of the aforementioned thermoplastic elastomer composition, and the thickness is generally 0.5 mm or more, preferably 1 mm to 10 cm.

In the case where a multi-layer structure is employed, the multi-layer structure may include a layer formed of a conventionally known rubber, thermoplastic elastomer, thermoplastic resin, thermosetting resin, or a similar material. In this case, an elastic member layer formed of the aforementioned thermoplastic elastomer composition is preferably provided in the vicinity of the outermost layer of the roller.

No particular limitation is imposed on the method for producing the roller. The roller may be produced by setting a roller which has been produced in advance from a conventional material or a shaft in a metal mold and insert-molding with the aforementioned thermoplastic elastomer composition. Alternatively, the roller may be produced by molding the aforementioned thermoplastic elastomer composition into a roller and incorporating a shaft into the molded roller. Yet alternatively, the roller may be produced through extrusion of the aforementioned thermoplastic elastomer composition such that the composition covers a shaft.

If desired, the outermost surface of the roller may be coated with a resin or surface-treated such as corona discharge treatment or vapor deposition.

EXAMPLES

The present invention will next be described in more detail by way of examples. Unless otherwise specified, "part(s)" and "%" referred to in the Examples, Comparative Examples, and Referential Examples are on a weight basis.

<Determination of Characteristic Parameters of Polymers>

Weight-average molecular weight, calibrated by standard polystyrene, of the polymers was determined through high-performance liquid gel permeation chromatography employing tetrahydrofuran serving as a carrier.

The component (a) content and the component (b) content were calculated from the peak areas attributed to the corresponding copolymers shown in a high-performance liquid gel permeation chromatogram.

The composition of each copolymer was determined through $^1$H-NMR.

<Preparation of Samples for Physical Property Evaluation>

Pellets of each of the produced polymers were molded by use of an injection molding apparatus (product of Nissei Plastics Industrial Co., Ltd., FS80S12ASE), thereby forming sheet samples (9 cm×9 cm, thickness: 2 mm). The sheet samples were employed as samples for determining hardness and tensile strength.

Pellets of each of the produced polymers were compression-molded by use of metal molds at 140° C. for five minutes, followed by cooling to room temperature. Test samples for evaluating compression set were released from the molds.

<Evaluation of Physical Properties>

Hardness of the samples was determined by use of a JIS A-type hardness meter in accordance with JIS K 6301.

Tensile strength of the samples was determined as a stress at break (MPa) under stretching at a tensile rate of 500 cm/min, in accordance with JIS K 6301.

Compression set of the samples was determined as a percent compression set (%) after 25% compression at 70° C. for 22 hours, in accordance with JIS K 6301.

<Evaluation of Rollers>

(1) Friction Coefficient

Friction coefficient of the surface of each roller was determined by use of a HEIDON friction tester (product of Shinto Scientific Co., Ltd.) under a load of 100 g at 100 mm/sec. The measurement was performed before passage of a paper sheet (initial) and after passage of 1,000 paper sheets. The friction coefficient was a value indicated by the tester.

(2) Abrasion Resistance

The amount of abrasion of the surface of each roller was determined by use of a HEIDON abrasion tester (product of Shinto Scientific Co., Ltd.), after the roller had been moved on a waterproof (No. 1,000) paper sheet at 6,000 mm/sec under a load of 100 g for 1,000 reciprocations. The amount of abrasion after 1,000 reciprocations is represented by an index as determined when abrasion resistance of the roller of Example 1 is 100. Thus, the greater the index, the more excellent the abrasion resistance.

(3) Drawing Force (Unit: g)

A sample roller was fixed in a paper feed member of a copying machine, and the load applied to a paper sheet during passage of the roller was determined by means of a load cell. The measurement was performed before passage of a paper sheet (initial) and after passage of 1,000 paper sheets. The greater the value, the greater the drawing force.

Referential Example 1

Cyclohexane (112 parts), N,N,N',N'-tetramethylethylenediamine (abbreviated as "TMEDA") (0.000728 parts), and styrene (11.7 parts) were placed in a pressure reactor, and the mixture was stirred at 40° C. To the mixture under stirring, n-butyllithium (0.0267 parts) serving as an initiator was added. The mixture was allowed to polymerize for one hour while polymerization temperature was elevated to 50° C. After completion of polymerization for one hour, the percent polymerization of styrene was found to be 100%. A portion of the reaction mixture was sampled and subjected to gel permeation chromatography, whereby the weight-average molecular weight of a polystyrene block was determined. The results are shown in Table 1.

Subsequently, isoprene (36.3 parts) was added to the reaction mixture under controlling of temperature over one hour such that the reaction temperature falls within a range of 50° C. to 60° C. After completion of addition, the mixture was further polymerized for one hour. After completion of this polymerization, the percent polymerization was found to be 100%. A portion of the reaction mixture was sampled and subjected to gel permeation chromatography, whereby the weight-average molecular weight of the formed styrene-isoprene diblock copolymer (corresponding to component (b)) was determined. The results are shown in Table 1.

Subsequently, dimethyldichlorosilane (0.0242 parts) serving as a coupling agent was added to the reaction mixture, and coupling reaction was performed for two hours, to thereby form a styrene-isoprene-styrene triblock copolymer (corresponding to component (a)). After completion of coupling, methanol (0.04 parts) serving as a polymerization terminator was added to the reactor, and the mixture was sufficiently mixed, whereby an aromatic vinyl-isoprene block copolymer composition I formed of components (a) and (b) was produced. A portion of the reaction mixture was sampled so as to determine the styrene unit content of the aforementioned composition I. The weight-average molecular weight of the entirety of the composition and the ratio by weight of component (a) to component (b) were determined through gel permeation chromatography. The results are shown in Table 1.

Referential Examples 2 to 5

The procedure of Referential Example 1 was repeated, except that the amount of TMEDA, n-butyllithium, styrene, isoprene, dimethyldichlorosilane, or methanol was changed as shown in Table 1, to thereby produce each of aromatic vinyl-isoprene block copolymer (formed of components (a) and (b)) compositions II to V. Table 1 shows the results.

TABLE 1

|  | Referential Examples | | | | |
| --- | --- | --- | --- | --- | --- |
|  | 1 | 2 | 3 | 4 | 5 |
| Components (a) and (b) | I | II | III | IV | V |
| Polymerization composition (parts) | | | | | |
| TMEDA ($\times 10^{-4}$) | 7.28 | 8.81 | 15.94 | 19.32 | 15.67 |
| n-Butyllithium ($\times 10^{-2}$) | 2.67 | 3.24 | 5.86 | 7.10 | 5.76 |
| Styrene | 11.7 | 11.6 | 13.7 | 8.6 | 13.7 |
| Isoprene | 36.3 | 36.4 | 34.3 | 39.4 | 34.3 |
| Dimethyldichlorosilane ($\times 10^{-2}$) | 2.42 | 2.93 | 5.19 | 6.79 | 2.03 |
| Methanol ($\times 10^{-2}$) | 4 | 4.85 | 8.78 | 10.64 | 8.63 |
| Characteristics of components (a) and (b) | | | | | |
| Entire wt. av. mol. wt. ($\times 10^3$) | 307 | 262 | 171 | 158 | 125 |
| Entire styrene unit content (%) | 24.28 | 24.28 | 28.57 | 18 | 28.57 |
| Wt. av. mol. wt. of component (a) ($\times 10^3$) | 332 | 275 | 182 | 162 | 184 |
| Wt. av. mol. wt. of polystyrene block of component (a) ($\times 10^3$) | 31 | 26 | 21 | 13 | 21 |
| Component (a) content (%) | 85 | 90 | 88 | 95 | 35 |
| Wt. av. mol. wt. of component (b) ($\times 10^3$) | 168 | 139 | 92 | 82 | 93 |
| Wt. av. mol. wt. of polystyrene block of component (b) ($\times 10^3$) | 31 | 26 | 21 | 13 | 21 |
| Component (b) content (%) | 15 | 10 | 12 | 5 | 65 |

Referential Example 6

Cyclohexane (112 parts), TMEDA (0.00364 parts), and n-butyllithium (0.134 parts) were placed in a pressure reactor, and the mixture was stirred at 40° C. To the mixture under stirring, isoprene (48 parts) was added over one hour while polymerization temperature was elevated to 60° C. After completion of addition of isoprene, polymerization was further performed at 60° C. for one hour. The percent polymerization of isoprene was found to be 100%. Subsequently, methanol (0.2 parts) serving as a polymerization terminator was added to the reactor, and the mixture was sufficiently mixed, whereby polyisoprene (i) having a weight-average molecular weight of 40,000 was produced.

Referential Example 7

The procedure of Referential Example 6 was repeated, except that the amount of TMEDA and that of n-butyllithium were changed to 0.000909 parts and 0.0334 parts, respectively, to thereby produce polyisoprene (ii) having a weight-average molecular weight of 171,000.

Example 1

A 30% solution (85 parts by weight) of aromatic vinyl-isoprene block copolymer composition I in cyclohexane and 30% solution (15 parts by weight) of polyisoprene (i) in cyclohexane were mixed, and an antioxidant 2,6-di-tert-butyl-p-cresol (0.3 parts) was added to the above mixture, followed by stirring. The thus-obtained mixed solution was gradually added dropwise to a hot water heated at 85 to 95° C., to thereby evaporate solvent. The thus-obtained precipitates were pulverized, and dried by air blow at 85° C.

The aforementioned pulverized product was supplied to a single-screw extruder equipped with an under water hot cutter at an extrusion tip thereof, to thereby produce pellets having a mean diameter of about 5 mm and formed of a thermoplastic elastomer composition shown in Table 2.

From the pellets, sheet-form test samples and test samples for determining compression set were obtained as described hereinabove. The test samples (moldings) were measured in terms of hardness, tensile strength, and compression set. The results are shown in Table 2.

Examples 2 to 4

The procedure of Example 1 was repeated, except that the formulation was changed as shown in Table 2, to thereby determine hardness, tensile strength, and compression set of each molding. The results are shown in Table 2.

Comparative Example 1

The procedure of Example 1 was repeated, except that no polyisoprene (component (c)) was incorporated and the formulation was changed as shown in Table 2, to thereby produce moldings. In a similar manner, hardness, tensile strength, and compression set of each molding were determined. The results are shown in Table 2.

Comparative Example 2

The procedure of Example 1 was repeated, except that a component (a) having a weight-average molecular weight of a polystyrene block lower than the level as stipulated by the invention was employed and the formulation was changed as shown in Table 2, to thereby produce moldings. In a similar manner, hardness, tensile strength, and compression set of each molding were determined. The results are shown in Table 2.

Comparative Example 3

The procedure of Example 1 was repeated, except that the formulation was changed as shown in Table 2 such that the component (a) content is lower than the level as stipulated by the invention and the component (b) content is in excess of the level as stipulated by the invention, to thereby determine hardness, tensile strength, and compression set of each molding. The results are shown in Table 2.

TABLE 2

|  | Examples | | | | Comparative Examples | | |
| --- | --- | --- | --- | --- | --- | --- | --- |
|  | 1 | 2 | 3 | 4 | 1 | 2 | 3 |
| Elastomer compositions | | | | | | | |
| Entire wt. av. mol. wt. (×10³) | 267 | 287 | 227 | 229 | 171 | 140 | 112 |
| Styrene unit content in entire composition (%) | 20.64 | 20.64 | 17.00 | 20.64 | 28.57 | 15.3 | 24.28 |
| Characteristics of each component | | | | | | | |
| Type of components (a) and (b) | I | I | I | II | III | IV | V |
| Wt. av. mol. wt. of component (a) (×10³) | 332 | 332 | 332 | 275 | 182 | 162 | 184 |
| Component (a) content (%) | 72.25 | 72.25 | 59.5 | 76.5 | 88 | 80.75 | 29.75 |
| Wt. av. mol. wt. of component (b) (×10³) | 168 | 168 | 168 | 139 | 92 | 82 | 93 |
| Component (b) content (%) | 12.75 | 12.75 | 10.5 | 8.5 | 12 | 4.25 | 55.25 |
| Type of component (c) | (i) | (ii) | (i) | (i) | — | (i) | (i) |
| Wt. av. mol. wt. of component (c) (×10³) | 40 | 171 | 40 | 40 | — | 40 | 40 |
| Component (c) content (%) | 15 | 15 | 30 | 15 | 0 | 15 | 15 |
| Physical properties of moldings | | | | | | | |
| JIS Hardness A | 27 | 31 | 16 | 27 | 71 | 29 | 15 |
| Tensile strength (MPa) | 9.2 | 8.7 | 8.1 | 13.3 | 30 | 9 | 1.5 |
| Compression set (%) | 20 | 27 | 17 | 39 | 90 | 95 | 85 |

The results shown in Table 2 indicate the following.

A molding formed of the elastomer composition of Comparative Example 1 which contains no polyisoprene (component (c)) is excellent in tensile strength, but has high hardness and exhibits increased compression set.

A molding formed of the elastomer composition of Comparative Example 2 which contains a component (a) having a weight-average molecular weight of a polystyrene block smaller than the level as stipulated by the invention has comparatively low hardness and is excellent in tensile strength, but exhibits increased compression set.

A molding formed of the elastomer composition of Comparative Example 3 which has a component (a) content smaller than the level as stipulated by the invention and a component (b) content higher than the level as stipulated by the invention has comparatively low hardness, but has poor tensile strength and exhibits increased compression set.

As compared with the samples of the Comparative Examples, the moldings produced from the elastomer composition satisfying the conditions as stipulated by the invention have low hardness and satisfactory tensile strength and exhibit suppressed compression set (Examples 1 to 4).

All the pellets employed in Examples 1 to 4 were not readily aggregated and could be handled easily.

Example 5

The pellets formed from the thermoplastic elastomer composition produced in Example 1 were fed to an injection molding apparatus (Nissei Plastics Industrial Co., Ltd., FS80S12ASE) and insert molded, to thereby fabricate a roller having a columnar metal shaft (diameter: 20 mm, length: 36 mm) and a hollow cylindrical elastic member (outer diameter: 28 mm, inner diameter: 20 mm, length: 26 mm).

The roller was evaluated, and the results are shown in Table 3.

Example 6

The procedure of Example 5 was repeated, except that the pellets formed from the thermoplastic elastomer composition produced in Example 2 were employed, to thereby fabricate a roller. The roller was evaluated, and the results are shown in Table 3.

Example 7

The procedure of Example 5 was repeated, except that the pellets formed from the thermoplastic elastomer composition produced in Example 3 were employed, to thereby fabricate a roller. The roller was evaluated, and the results are shown in Table 3.

Example 8

The procedure of Example 5 was repeated, except that the pellets formed from the thermoplastic elastomer composition produced in Example 4 were employed, to thereby fabricate a roller. The roller was evaluated, and the results are shown in Table 3.

Comparative Example 4

A vulcanizable rubber composition having the following formulation was prepared. The vulcanizable rubber composition was press-vulcanized at 160° C. for 20 minutes, and a roller was fabricated, which had a columnar metal shaft (diameter: 20 mm, length: 36 mm) and a hollow cylindrical vulcanized rubber member (outer diameter: 28 mm, inner diameter: 20 mm, length: 26 mm). The roller was evaluated, and the results are shown in Table 3.

(Formulation)

| Formulated components | Amount (parts) |
| --- | --- |
| EPDM | 100 |
| Paraffin oil | 90 |
| Activated zinc oxide | 3 |
| Stearic acid | 1 |
| Silica | 20 |
| Clay | 20 |
| FEF carbon black | 1 |

-continued

| Formulated components | Amount (parts) |
|---|---|
| Titanium oxide | 8 |
| γ-Mercaptopropyltrimethoxysilane | 1.5 |
| Sulfur | 1.5 |
| Vulcanizing accelerators | |
| Tetramethylthiuram disulfide | 0.5 |
| Dibenzothiazyl disulfide | 1.5 |
| Di-n-butylzinc dithiocarbamate | 0.5 |
| Mercaptobenzothiazole | 0.5 |

TABLE 3

| | Examples | | | | Comparative Example |
|---|---|---|---|---|---|
| | 5 | 6 | 7 | 8 | 4 |
| Friction coefficient | | | | | |
| Initial | 1.35 | 1.2 | 1.5 | 1.3 | 1.06 |
| After passage of 1,000 sheets | 1.3 | 1.15 | 1.4 | 1.25 | 0.89 |
| Abrasion resistance | 100 | 94 | 102 | 99 | 57 |
| Drawing force (g) | | | | | |
| Initial | 130 | 112 | 136 | 124 | 90 |
| After passage of 1,000 sheets | 121 | 95 | 130 | 116 | 67 |

The results shown in Table 3 indicate the following.

The roller of Comparative Example 4 employing vulcanized rubber exhibits small friction coefficient and drawing force. These characteristic values are considerably deteriorated after repeated use. Moreover, abrasion resistance of the roller is poor.

As compared with the rollers of the Comparative Example, the roller of the present invention exhibits large friction coefficient and drawing force, and these characteristic values do not tend to be deteriorated even after repeated use. Abrasion resistance of the roller is also excellent. Therefore, the roller of the present invention is suitably employed as roller members such as a paper transport roller and a paper feed roller.

INDUSTRIAL APPLICABILITY

The roller of the present invention includes, as a component member, a molding of a thermoplastic elastomer composition which exhibits suppressed compression set and satisfactory tensile strength while exhibiting low hardness. Therefore, the roller is suitably employed as a paper feed roller or a paper transport roller, a pressure roller, a fixing roller, a discharge roller, a separation roller, a cleaning roller, a developing roller, a resist roller, a charging roller, a double-feed preventive roller, a feed roller, a printing roller, or a bill transport roller used in OA equipment, business machines, and industrial equipment such as a photocopyier, a facsimile machine, a register, a cash dispenser, a printer, and a ticket-gate reader. Among them, the roller is particularly suitably employed as a paper feed roller or a paper transport roller.

In addition to being applied to rollers, the molding of the present invention, due to its excellent characteristics, finds a variety of uses as follows: food-related uses such as film, trays, beverage container caps, and tableware; adhesive sheets/protection films formed from a single layer or laminated with polypropylene or polyethylene film; daily-use articles such as mattresses and cushions that do not produce bedsores; toys such as tires for radio-controlled vehicles and dolls; sporting goods such as balls, grips, and shock absorption materials; stationary such as fingerstalls and desk mats; interior/exterior automotive products such as wiper blades, housing covers for airbag equipment; products used at civil engineering/construction sites such as waterproof sheets and other sheets used at civil engineering sites; vibration isolation/control products used in audio-visual equipment/information-related equipment/information transmission equipment such as microphone holders, cone edges of a speaker, holders of various disks/optical disks/tapes, insulators/packings for hard disk drives, insulators for motors such as spindle motors for HDDs, and waterproof packings for mobile phones; home electronics products such as gaskets for refrigerators; clothing products; footwear products such as sandals, shoes, and insoles; textile products; medical products such as infusion tubes, chemical bottle stoppers, catheters, and gaskets/caps for medical equipment; and sanitary products such as paper diapers/sanitary napkins. The molding of the present invention further finds utility in the fields of chemical/mineral industry materials, packaging/shipping materials, and agricultural/stock raising/fisheries materials, for forming packings, gaskets, seals, shock absorbing materials, cushioning materials, etc.

The invention claimed is:

1. A molding formed of a thermoplastic elastomer composition consisting essentially of: an aromatic vinyl-isoprene block copolymer (a) including two or more poly (aromatic vinyl) blocks each having a weight-average molecular weight of 14,000 to 100,000, in an amount of 55 to 95 wt %; an aromatic vinyl-isoprene diblock copolymer (b) including a poly(aromatic vinyl) block having a weight-average molecular weight of 14,000 to 100,000 in an amount of 5 to 30 wt %; and polyisoprene (c) having a weight-average molecular weight of 5,000 to 300,000, in an amount of 5 to 33 wt %; wherein the composition has an aromatic vinyl monomer unit content of 14 to 30 wt % based on the total amount of the components (a), (b), and (c).

2. A molding as described in claim 1, wherein the aromatic vinyl-isoprene block copolymer (a) has an aromatic vinyl monomer unit content of 17 to 50 wt %.

3. A molding as described in claim 1, wherein the aromatic vinyl-isoprene block copolymer (a) has a weight-average molecular weight of 120,000 to 1,200,000.

4. A molding as described in claim 1, wherein the aromatic vinyl-isoprene diblock copolymer (b) has an aromatic vinyl monomer unit content of 17 to 150 wt %.

5. A molding as described in claim 1, wherein the aromatic vinyl-isoprene diblock copolymer (b) has a weight-average molecular weight of 60,000 to 250,000.

6. A molding as described in claim 1, wherein the aromatic vinyl monomer is styrene.

7. A molding as described in claim 1, wherein the thermoplastic elastomer composition comprises the aromatic vinyl-isoprene block copolymer (a) in an amount of 55 to 89 wt %; the aromatic vinyl-isoprene diblock copolymer (b) in an amount of 5 to 30 wt %; and the polyisoprene (c) in an amount of 10 to 30 wt %.

8. A molding as described in claim 1, which is formed through injection molding.

9. A roller comprising a molding as recited in claim 1 serving as an elastic member.

10. A roller as described in claim 9, which is a paper feed roller or a paper transport roller.

* * * * *